United States Patent
Xiong et al.

(10) Patent No.: US 9,609,502 B2
(45) Date of Patent: Mar. 28, 2017

(54) ADAPTIVE SILENCING MECHANISM FOR DEVICE-TO-DEVICE (D2D) DISCOVERY

(71) Applicant: INTEL IP CORPORATION, Santa Clara, CA (US)

(72) Inventors: Gang Gary Xiong, Beaverton, OR (US); Debdeep Chatterjee, Santa Clara, CA (US); Huaning Niu, Milpitas, CA (US); Alexey Khoryaev, Nizhny Novgorod (RU); Sergey Panteleev, Nizhny Novgorod (RU)

(73) Assignee: INTEL IP CORPORATION, Santa Clara, CA (US)

( * ) Notice: Subject to any disclaimer, the term of this patent is extended or adjusted under 35 U.S.C. 154(b) by 76 days.

(21) Appl. No.: 14/582,990

(22) Filed: Dec. 24, 2014

(65) Prior Publication Data

US 2015/0245193 A1  Aug. 27, 2015

Related U.S. Application Data

(60) Provisional application No. 61/943,974, filed on Feb. 24, 2014.

(51) Int. Cl.
| | |
|---|---|
| *H04W 8/00* | (2009.01) |
| *H04W 76/02* | (2009.01) |
| *H04W 4/00* | (2009.01) |
| H04W 48/12 | (2009.01) |

(52) U.S. Cl.
CPC ........... *H04W 8/005* (2013.01); *H04W 4/008* (2013.01); *H04W 76/023* (2013.01); *H04W 48/12* (2013.01)

(58) Field of Classification Search
CPC .... H04W 8/005; H04W 4/008; H04W 76/023
(Continued)

(56) References Cited

U.S. PATENT DOCUMENTS

2011/0258327 A1  10/2011  Phan et al.
2013/0109301 A1  5/2013  Hakola et al.
(Continued)

FOREIGN PATENT DOCUMENTS

TW         201406116 A    2/2014
WO    WO 2013/163599 A2   10/2013
(Continued)

OTHER PUBLICATIONS

3GPP TSG RAN WG1 Meeting #76; R1-140134; Prague, Czech Republic, Feb. 10-14, 2014; D2D discovery resource selection for Type 1 discovery; Agenda item: 7.2.8.2.2.
(Continued)

*Primary Examiner* — Ronald B Abelson
(74) *Attorney, Agent, or Firm* — Thorpe North & Western

(57) ABSTRACT

Novel adaptive silencing schemes for device-to-device (D2D) discovery based on loading conditions in a discovery zone are disclosed herein. These adaptive silencing schemes can be used to mitigate interference and data collisions in networks where D2D connections can be formed. In some embodiments, a silencing factor is used to probabilistically determine whether a user equipment (UE) will transmit one or more D2D discovery signals in the discovery zone. Loading conditions in a current discovery zone can be estimated using several different approaches and metrics described herein. The silencing factor can be increased or decreased for a subsequent discovery zone based on the values of one or more of the metrics described herein for the current discovery zone.

28 Claims, 7 Drawing Sheets

(58) Field of Classification Search
USPC .................................................. 370/328, 329
See application file for complete search history.

(56) References Cited

U.S. PATENT DOCUMENTS

| | | |
|---|---|---|
| 2013/0109314 A1 | 5/2013 | Kneckt et al. |
| 2013/0157656 A1 | 6/2013 | Gao et al. |
| 2015/0043448 A1* | 2/2015 | Chatterjee ............. H04W 8/005 370/329 |
| 2015/0223141 A1* | 8/2015 | Chatterjee ........... H04W 40/246 370/329 |

FOREIGN PATENT DOCUMENTS

| | | |
|---|---|---|
| WO | WO 2013/165834 A1 | 11/2013 |
| WO | WO 2014/130156 A1 | 8/2014 |

OTHER PUBLICATIONS

3GPP TSG-SA2 Meeting #101; Taipei, Taiwan, Jan. 20-24, 2014; S2-140568; LS reply on discovery message size; Release 12.
3GPP TS 36.101 V12.2.0 (Dec. 2013) Technical Specification Group Radio Access Network; Evolved Universal Terrestrial Radio Access (E-UTRA); User Equipment (UE) radio transmission and reception (Release 12).
3GPP TS 36.213 V12.0.0 (Dec. 2013) Technical Specification Group Radio Access Network; Evolved Universal Terrestrial Radio Access (E-UTRA); Physical layer procedures (Release 12).

* cited by examiner

ADAPTIVE SILENCING MECHANISM FOR DEVICE-TO-DEVICE (D2D) DISCOVERY

The present application claims priority to U.S. Provisional Patent Application No. 61/943,974, filed Feb. 24, 2014, the entire specification of which is hereby incorporated by reference in its entirety for all purposes.

BACKGROUND

Proximity-based applications and services represent a fast growing social and technological trend that may have a major impact on evolution of cellular wireless/mobile broadband technologies. These services are based on the awareness of two devices or two users being close to each other and may include such applications as public safety operations, social networking, mobile commerce, advertisement, gaming, etc. Device to device (D2D) discovery is the first step to enable D2D service. With direct D2D communication, user equipment (UE) may communicate directly with each other without involvement of a base station or an enhanced node B (eNB). One issue with D2D communication is device discovery to enable D2D service. Device discovery involves discovering one or more other discoverable UEs within communication range for D2D communication. Device discovery also involves being discovered by one or more other discovering UEs within communication range for D2D communication. There are many unresolved issues with respect to device discovery for D2D communication including resource allocation and signaling, particularly for Proximity Service (ProSe) D2D discovery.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
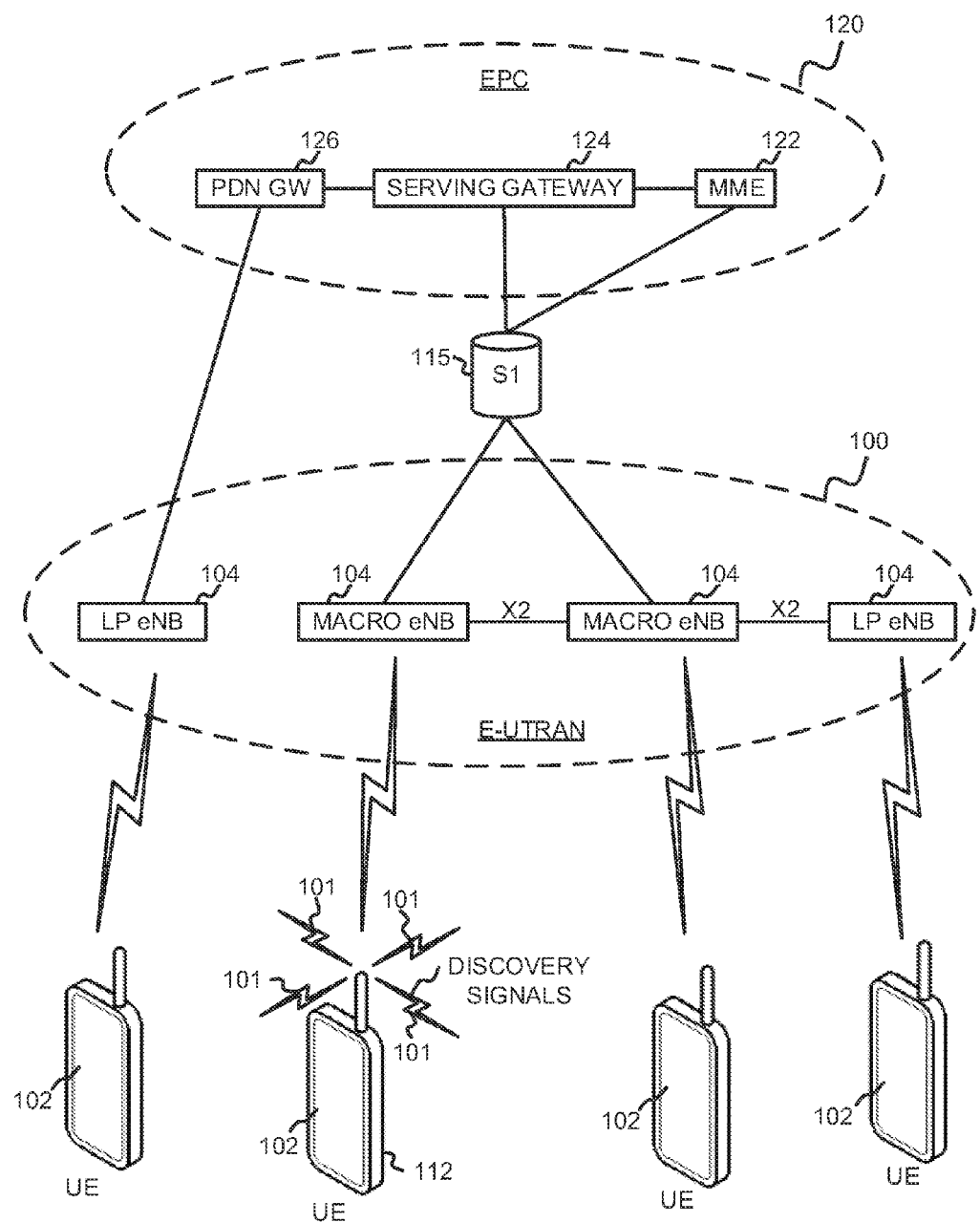
FIG. 1 shows a portion of an end-to-end network architecture of an LTE network in accordance with some embodiments.

Reference will now be made to the exemplary embodiments illustrated and specific language will be used herein to describe the same. It will nevertheless be understood that no limitation of the scope is thereby intended.

DETAILED DESCRIPTION

Before the some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter Embodiments disclosed herein provide signaling designs for the support of LTE Proximity Services (ProSe) D2D discovery. In these embodiments, UEs may be ProSe-enabled UEs configured for D2D discovery signal transmission and D2D communication. Some embodiments provide configuration of D2D discovery zones (i.e., discovery resource pools) with partitioning of D2D Discovery Zones into contention-based and non-contention-based Discovery Zones for both network-common and cell-specific configurations of discovery zones. Some embodiments provide mechanisms for UE feedback to provide an eNB with information about the loading of discovery zones. Some embodiments provide options for support of inter-cell/eNB discovery. Some embodiments provide for the use and configuration of silencing factors for random silencing/adaptive random silencing for transmission of D2D discovery packets. Some embodiments provide for signaling contents that include: the discovery zone configuration, a silencing factor, a transmit power control configuration, hopping related parameters, and a scrambling identity for scrambling of cyclic-redundancy check (CRC) mask of discovery packets. Some embodiments provide signaling mechanisms for the above-mentioned signaling contents. Some embodiments provide for static provisioning and/or pre-configuration of D2D discovery resources. Some embodiments provide for network and UE behavior to support contention-free direct device discovery. These embodiments are discussed in more detail below.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs. UEs 102 may be ProSe-enabled.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN may be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some LTE embodiments, a physical downlink shared channel (PDSCH) carries user data and higher-layer signaling to a UE 102. The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs within a cell) is performed at the eNB 104 based on channel quality information fed back from the UEs 102 to the eNB 104, and then the downlink resource assignment information is sent to a UE on a physical downlink control channel (PDCCH) used for (and possibly assigned to) the UE 102.

The PDCCH uses CCEs (control channel elements) to convey the control information. Before being mapped to resource elements, the PDCCH complex-valued symbols may be first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH may be transmitted using one or more CCEs, depending on the size of DCI and the channel condition. There may be four or more different PDCCH formats defined in LTE with different numbers of CCEs (e.g., aggregation level, L=1, 2, 4, or 8).

In accordance with some embodiments, the UEs 102 that are ProSe-enabled may be arranged for device-to-device (D2D) communications including D2D discovery of other UEs 102 for direct D2D communication. In these embodiments, ProSe-enabled UEs 102 may transmit discovery signals 101 within discovery resources to discover one or more other ProSe-enabled UEs. These embodiments are discussed in more detail below.

Figure 2:
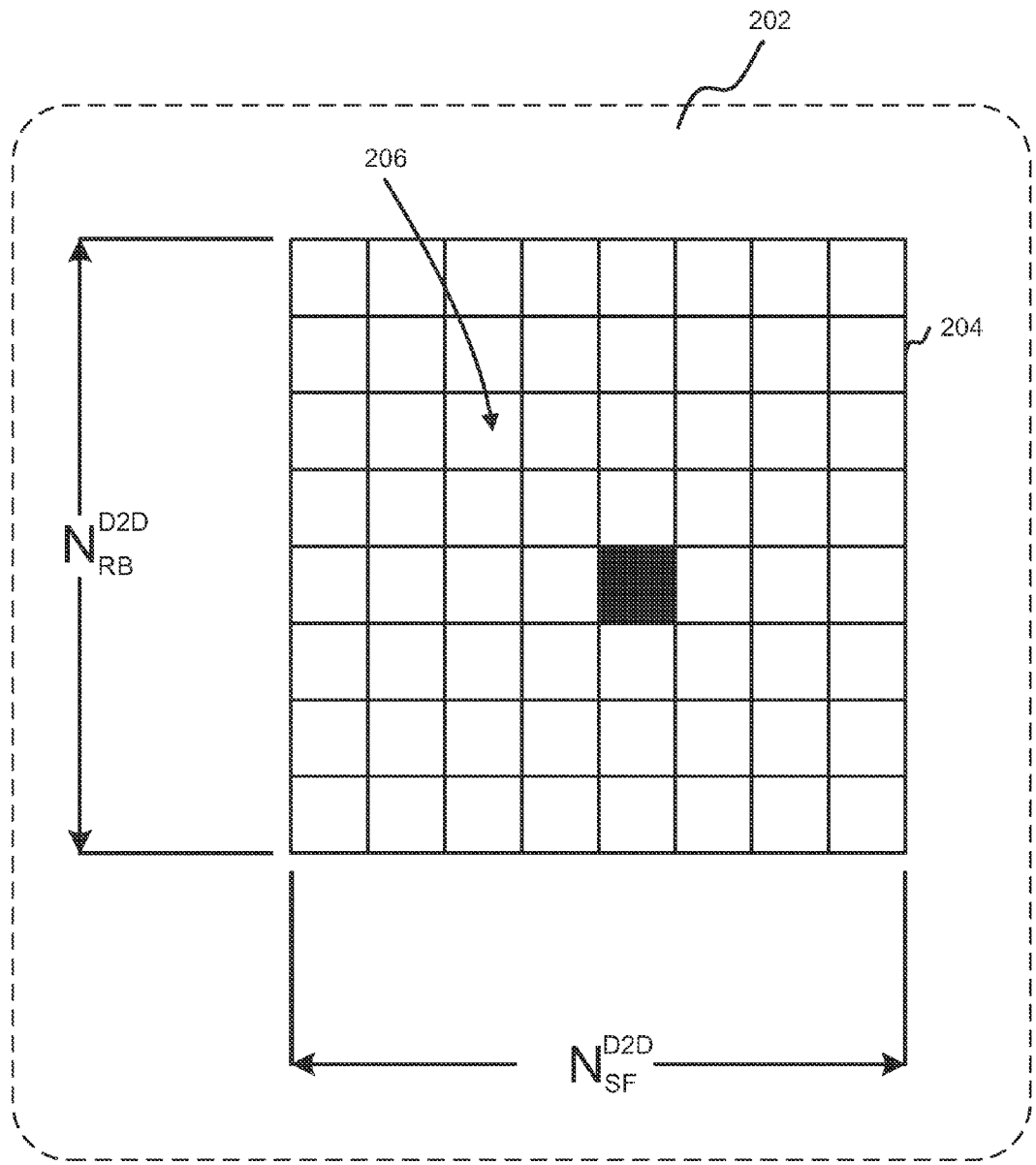
FIG. 2 shows a structure for a resource grid including a discovery zone for D2D communications in accordance with some embodiments.

FIG. 2 shows a structure for a resource grid including a discovery zone for D2D communications in accordance with some embodiments. The depicted grid is a time-frequency grid, called a resource grid, which is the physical resource in the downlink or uplink in each slot. The smallest time-frequency unit in a resource grid is denoted as a resource element (RE). The resource grid comprises a number of resource blocks (RBs) which describe the mapping of certain physical channels to resource elements. Each resource block comprises a collection of resource elements and in the frequency domain, represents the smallest quanta of resources that may be allocated, although the scope of the embodiments is not limited in this respect. There are several different physical channels that are conveyed using such resource blocks. The resource grid illustrated in FIG. 2 may comprise an LTE operation zone 202 which may comprise a plurality of physical RBs (PRBs) for use by the RAN 100.

In accordance with some embodiments, a UE 102 (FIG. 1) may receive signaling from an eNB 104 (FIG. 1) indicating a discovery zone 204 within the LTE operation zone 202.

The discovery zone 204 may comprise a plurality of PRBs 206 of a discovery resource. The UE 102 may transmit a discovery signal or discovery packet 101 (FIG. 1) for receipt by one or more other UEs for D2D discovery within some PRBs 206 of the discovery zone 204. In some embodiments, the resources allocated for D2D discovery may be resources of a physical-uplink shared channel (PUSCH), although the scope of the embodiments is not limited in this respect.

A PRB may be associated with a particular slot of a subframe in the time dimension and a particular group of frequency subcarriers in the frequency dimension. Each PRB, for example, may be identified by a RB index and a subframe index. In some embodiments, a discovery packet 101 may be transmitted within M subframes of N resources blocks where M and N are at least one and may be greater than one. These embodiments are described in more detail below.

In some embodiments, a PRB may comprise twelve sub-carriers in the frequency domain by 0.5 ms (i.e., one slot) in the time domain. The PRBs may be allocated in pairs (in the time domain), although this is not a requirement. In some embodiments, a PRB may comprise a plurality of REs. A RE may comprise one sub-carrier by one symbol. When a normal CP is used, a RB contains seven symbols. When an extended CP is used, the RB contains six symbols. A delay spread that exceeds the normal CP length indicates the use of extended CP. Each subframe may be one millisecond (ms) and one frame may comprise ten such subframes.

There are two different approaches in D2D discovery: restricted/closed D2D discovery and open D2D discovery. Restricted/closed D2D discovery applies to use cases wherein a discoverable device may be discovered only by a select set of ProSe-enabled discovering devices. A further implication of closed device discovery is consideration of scenarios wherein a discovering device tries to discover particular ProSe-enabled device(s) (one or many from a set of ProSe-enabled devices). Thus, for this use case, a discovering device would be assumed to know the ProSe-enabled device it wishes to discover in its proximity.

Contrary to closed D2D discovery, open device discovery considers use cases wherein a discoverable device may want itself to be discovered by other ProSe-enabled devices in its proximity. From the perspective of the discovering device, open device discovery implies that a discovering device may not be assumed to be aware of the identity of other ProSe-enabled devices prior to discovery. Consequently, the device discovery mechanism for open discovery should aim towards discovering as many ProSe-enabled devices in its proximity as possible.

For open D2D discovery, an eNB 104 has limited control on the discovery process among UEs 102. In particular, an eNB 104 may periodically allocate certain discovery resources in the form of D2D discovery regions for a UE 102 to transmit the discovery information. The discovery information may be in the form of discovery sequence or discovery packet with payload information. The discovery related information content that UEs intend to share with each other may be higher as the design would need to transmit the unique ID for device identification, service identity, etc. (e.g., 48 bits or more) as data payload, protected by CRC. The number of resource blocks (RB) required for discovery packet transmission in open D2D discovery design, which is denoted as $L_{RB}^{D2D}$, may be 1 or more, depending on the payload size and the overall discovery performance requirement.

In some embodiments, a discovery region may comprise a number of occurrences of periodic discovery zones, with each discovery zone comprising of some RBs in frequency domain and several subframes in time domain. FIG. 2 shows an example of a discovery zone 204 within LTE operation zone 202 in which, $N_{RB}^{D2D}$, $n_{RB}^{start}$, $N_{SF}^{D2D}$ and $n_{SF}^{start}$ are denoted as the number of allocated RBs, the starting RB index and the number of subframes, the starting subframe index of each discovery zone, respectively. The information regarding the partitioning of these D2D discovery regions may be semi-statically signaled by the eNB using RRC signaling or by System Information Blocks (SIBS) for within network coverage scenarios. For the partial network coverage scenario, such information may be forwarded by the coordinator UE to the UEs that are outside network coverage. For out of network coverage scenario, the discovery zone may be predefined or broadcasted by the centralized D2D device.

In some embodiments, the $N_{RB}^{D2D}$ and $n_{RB}^{start}$ parameters are not included in the D2D zone configuration message, and instead, the full system bandwidth, except the PUCCH region (at band edges), may be designed to be exclusively reserved for D2D discovery from system perspective, although the scope of the embodiments is not limited in this respect. In some embodiments, the parameter $n_{SF}^{start}$ may be configured as a periodicity for D2D discovery zone allocation.

Even for the case of UE-based open discovery, it would be beneficial to exploit potential network assistance in UE-specific discovery resource allocation for transmission of discovery signals for the UEs in RRC_CONNECTED mode, and thereby improve the efficiency of the discovery process. In this regard, each D2D Discovery Region (D2D-DZ) or discovery resource pool may be further divided into two orthogonal time-frequency zones: (1) Non-contention-based D2D DZ (NCB-D2D DZ) for which the eNB allocates periodic resources for transmission of discovery signals and this region is accessible to D2D UEs in RRC_CONNECTED mode; (2) Contention-based D2D DZ (CB-D2D DZ), also known as a type I discovery resource pool or a discovery resource pool for UE-autonomous resource selection: This region is, in general, available to all D2D UEs (including out of coverage UEs) wherein D2D-enabled UEs follow a purely contention-based transmission of discovery signals. Moreover, the D2D discovery resources used for CB-D2D DZ might be further divided into two parts, called Part A and Part B to enable D2D discovery and to roughly indicate the required size of D2D communication resources (e.g., the number of subframes for D2D communication) depending of the amount of D2D data buffered at UE side, especially due to the fact that D2D discovery procedure may be followed by a D2D communication operation. The use of a D2D discovery resource from one group indicates preference for the larger amount of resources then one predefined threshold.

In accordance with some embodiments, a D2D discovery zone may be configured in two distinct ways: network-common D2D discovery zone and cell-specific D2D discovery zone, the details of which are described below. For network-common discovery zones, a common set of time-frequency resources may be reserved for D2D discovery across the entire network. The configuration could be different between different Public Land Mobile Networks (PLMNs) to enable the respective operators a certain degree of flexibility in resource provisioning. The discovery zone may be provisioned by each PLMN via the Operations, Administration, and Maintenance (OAM) tools. Network-common configuration of discovery zones may be signaled via multiple ways. The exact resource provisioning may be determined based on the statistics of the number of ProSe-enabled UEs in the network, their respective capabilities and location (up to the tracking area (TA) granularity). This information is available at the D2D server and the D2D server can inform the eNBs of the exact resource configuration via the Mobility Management Entity (MME).

For cell-specific discovery zones, each eNB 104 may determine the exact resource configuration for the cell-specific discovery zones or discovery resource pools using information on the current number of active ProSe-enabled UEs 102 and the interference situation. Some of this information may be obtained via periodic/event-triggered/on-demand feedback from the ProSe-enabled UEs 102 participating in the discovery process. To enable inter-eNB D2D discovery, a certain level of coordination between neighboring eNBs exists and may be achieved via exchange of information on the configuration of discovery zones between neighboring eNBs over an X2 interface.

In accordance with embodiments, an eNB 104 may transmit signaling to indicate D2D discovery zone configuration to ProSe-enabled UEs 102. The signaling may indicate time and frequency resources and a periodicity of the discovery zone 204 and may indicate operational parameters for the discovery zone 204. The resources of the D2D discovery zone 204 may be allocated for D2D discovery signal transmission by the ProSe-enabled UEs 102.

In some embodiments, the D2D discovery zone configuration signaling may indicate one or more occurrences of the discovery zone 204 and is sent by the eNB 104 either semi-statically using radio-resource control (RRC) signaling or sent using SIBs. In the example illustrated in FIG. 2, the discovery zone 204 comprises a plurality of PRBs 206 within an LTE operation zone 202 and the discovery zone 204 may occur periodically or regularly.

In some embodiments, the signaling is sent by the eNB either using dedicated RRC signaling or sent using common radio-resource control (RRC) signaling via SIBs (i.e., SIB signaling). When the signaling sent by the eNB uses common RRC signaling via SIBs, the signaling sent by the eNB may include at least one of a SIB transmission and a paging transmission. In some embodiments, the configuration information may either added to an existing SIB (e.g., in accordance with LTE Release 11) or is signaled via a newly defined SIB (e.g., in accordance with al later LTE release).

For signaling in the case of both network-common and cell-specific discovery zone allocation, the network should be able to signal this information to UEs in both RRC_CONNECTED and RRC_IDLE modes of operation. For network-common D2D discovery zone allocation, different signaling mechanisms may be applied. In some embodiments, existing system information block (SIBs) (e.g., SIB2) may be used to signal the D2D discovery zone configuration information including a silencing factor and other related cell- or network-common parameters discussed in more detail below.

In some embodiments, the discovery zone 204 may be referred to or considered a discovery period. In some embodiments, contention-based D2D discovery may be referred or considered Type 1 discovery while non-contention based D2D discovery may be referred to or considered Type 2 discovery.

In some embodiments, the D2D discovery zone configuration signaling indicates at least one of a non-contention-based D2D discovery zone (NCB-D2D DZ) for which periodic resources are allocated for non-contention based transmission of discovery signals 101 by only ProSe-enabled UEs in RRC connected mode, and a contention-based D2D discovery zone (CB-D2D DZ) for which periodic resources are allocated for contention-based transmission of discovery signals 101 by any ProSe-enabled UEs including ProSe-enabled UEs in RRC connected mode, RRC idle mode and out of coverage UEs. In these embodiments, the non-contention-based D2D discovery zone may be designated for transmission of discovery signals 101 in accordance with a non-contention based technique by ProSe-enabled UEs in RRC connected mode. In some embodiments, ProSe-enabled UEs in RRC connected mode may be assigned specific discovery resources of the non-contention-based D2D discovery zone for their transmission of discover signals 101. In some embodiments, the D2D discovery zone configuration signaling may indicate that the discovery zone 204 is partitioned into a non-contention-based D2D discovery zone and a contention-based D2D discovery zone.

In some of these embodiments, the contention-based D2D discovery zone may be designated for transmission of discovery signals 101 in accordance with a purely contention based technique by any ProSe-enabled UE. In these embodiments, ProSe-enabled UEs are not assigned specific discovery resources of the contention-based transmission of discover signals 101. ProSe-enabled UEs that utilize the contention-based D2D discovery zone may include ProSe-enabled UEs in RRC connected mode, ProSe-enabled UEs in RRC idle mode, and ProSe-enabled UEs that are out of coverage.

In some of these embodiments, an eNB 104 may provide the signaling of D2D discovery resources and both contention-based and contention-free D2D discovery resources may be partitioned and configured by the eNB. In some embodiments, the partitioning may be logical. For the actual partitioning of resources, it would eventually be up to the network or the eNB, (i.e., based on implementation). In some embodiments, some of the physical resources overlap between the two zones/resource pools, although the scope of the embodiments is not limited in this respect.

In some embodiments, application layer signaling may be used to signal the D2D discovery zone configuration. In these embodiments, a D2D server may signal the D2D discovery zone configuration during D2D registration of the ProSe-enabled UEs. Changes to the D2D discovery zone configuration may be signaled to the ProSe-enabled UEs by application layer reconfiguration messages from the D2D server.

In some embodiments, non-access stratum (NAS) signaling may be used to signal the D2D discovery zone configuration. In these embodiments, a mobility management entity (MME) may signal the D2D discovery zone configuration during D2D registration of the ProSe-enabled UEs with a D2D server. In these embodiments, either the UE or the D2D server may request the discovery zone information. For both of the above signaling options (application layer or NAS signaling), it may be less efficient to support contention-free resource allocation to RRC_CONNECTED UEs because discovery zone resource is managed by the MME instead of the eNB and consequently, dynamic resource allocation is not preferred due to the signaling overhead in core network.

Figure 3A:
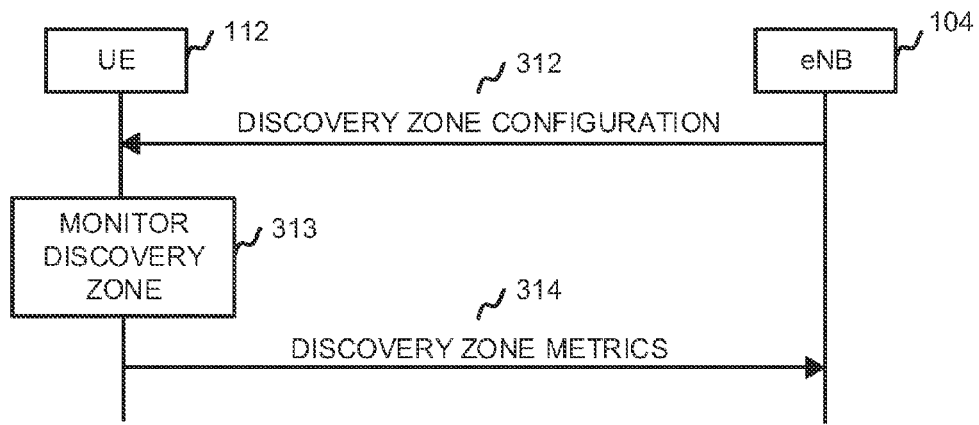
FIG. 3A illustrates the reporting of discovery zone metrics in accordance with some embodiments.

FIG. 3A illustrates the reporting of discovery zone metrics in accordance with some embodiments. In these embodiments, an eNB 104 (FIG. 1) may be configured to receive discovery zone loading metrics, the discovery zone loading metrics based on monitoring of discovery signals 101 (FIG. 1) within the discovery zone 204 (FIG. 2) by one or more ProSe-enabled UEs 102 (FIG. 1). The eNB 104 may determine whether or not to make changes to a resource allocation configuration for D2D activities based on the discovery zone loading metrics. In these embodiments, ProSe-enabled UEs 102 may monitor the discovery zone 204 for D2D discovery signals 101 transmitted by other ProSe-enabled UEs 102 and report discovery zone loading metrics to the eNB 104. Based on the discovery zone loading metrics, the eNB 104 may make changes to its resource allocation configuration for D2D activities including resources for D2D discovery and resources for D2D communications. In some embodiments, based on the discovery zone loading metrics, the eNB 104 may make changes to optimize the resource allocation configuration for D2D activities. For example, the eNB 104 may change the size of the resource pool for D2D activities and may allocate subsequent discover zone resources as well as allocate resources for subsequent D2D communication based on the discovery zone loading metrics. Based on the discovery zone loading metrics, the eNB 104 may also apply or suspend one or more interference control techniques, for example, by changing parameters for interference suppression (such as random silencing or random probabilistic transmission). As illustrated in FIG. 3A, a ProSe-enabled UE 102 may receive signaling 312 indicating a discovery zone configuration from an eNB 104. The UE 102 may monitor the discovery zone in operation 313 and may report discovery zone metrics in message 314.

In some embodiments, the discovery zone metrics include a count of discovery signal transmissions in a number of occurrences of the discovery zone (e.g., a count number). In some embodiments, the discovery zone metrics further include a number of unique discovery signal transmissions, and the eNB may determine a number of ProSe-enabled UEs 102 based on the discovery zone loading metrics. In some embodiments, the discovery zone metrics may include at least one of: a number of discovery signal transmissions in a number of occurrences of the discovery zone; a number of successfully detected discovery signals in a number of occurrences of the discovery zone; and an indication of the interference level in a number of occurrences of the discovery zone. In some of these embodiments, ProSe-enabled UEs may be able to distinguish the discovery signal transmissions of other UEs based on the DMRS, and the discovery zone metrics may include a number of blindly detected unique DMRS sequences or unique cyclic shift values.

In these embodiments, UEs may be configured to provide feedback for configuration of D2D discovery zones. For the case of cell-specific discovery zone configurations, the eNB may receive information on the loading in the cell from ProSe-enabled UEs participating in the discovery process. However, an eNB may only know about the number of such ProSe-enabled UEs in RRC_CONNECTED mode. The eNB may not be aware of the number of the RRC_IDLE mode UEs participating in D2D discovery within its serving area. Some embodiments provide the eNB with the information about the loading of the discovery zones are realized via enabling UE feedback.

In some embodiments, ProSe-enabled UEs may report the number of transmissions in the past N discovery zones, where N may be a pre-determined or configurable parameter, in the form of a paging response. Since the paging cycle may be configured in a UE-specific way with different groups of LTES assigned different subframes for monitoring paging, the number of UEs initiating a random access (RA) procedure as a paging response to provide this feedback may be managed by the eNB. Note that given the low duty cycle of the configuration of the discovery zones, it would not be necessary for the eNB to request for this feedback from all RRC_IDLE mode UEs at the same paging subframe to estimate the amount of loading of the discovery zones. Since the silencing factor may be configured by the eNB, its impact may be factored in by the eNB in deriving this estimate.

The request for the feedback on number of transmissions in the past N discovery zones may be added to the paging message and enabled by the eNB when it requires a UE or a set of UEs to report this metric. Additionally, the number of RRC_CONNECTED mode UEs participating in D2D discovery may be known to the eNB by using the above mechanism or via feedback requests indicated via dedicated RRC or MAC CE signaling.

In some other embodiments, a UE may report discovery related metrics or measurement reporting similar to Minimization Driving Test (MDT) or as a part of MDT reporting. In idle mode, the UE stores and accumulates the measurement and reports the logged measurement once the UE is connected. In connected mode, the UE can report discovery related measurement in a periodic or event-triggered manner. Since reporting is not immediate in case of idle mode, time stamp that indicates the moment of logging measurement results may need to be included. In addition, the detailed location related information (e.g. cell index or GPS information) may be also included. For discovery related metrics or measurements, as described above, the number of transmissions in the past N discovery zones may be reported. Alternatively, the interference level or the number of successfully detected D2D discovery packet transmissions may be reported. For instance, assuming discovery packet transmissions using randomly selected DM-RS base sequences and/or cyclic shifts (for PUSCH-based discovery packet transmission), the UEs can report the number of blindly detected unique DM-RS sequences or cyclic shifts summed or averaged over the most recent N1 D2D discovery zone, where N1 may be pre-determined or configurable.

Figure 3B:
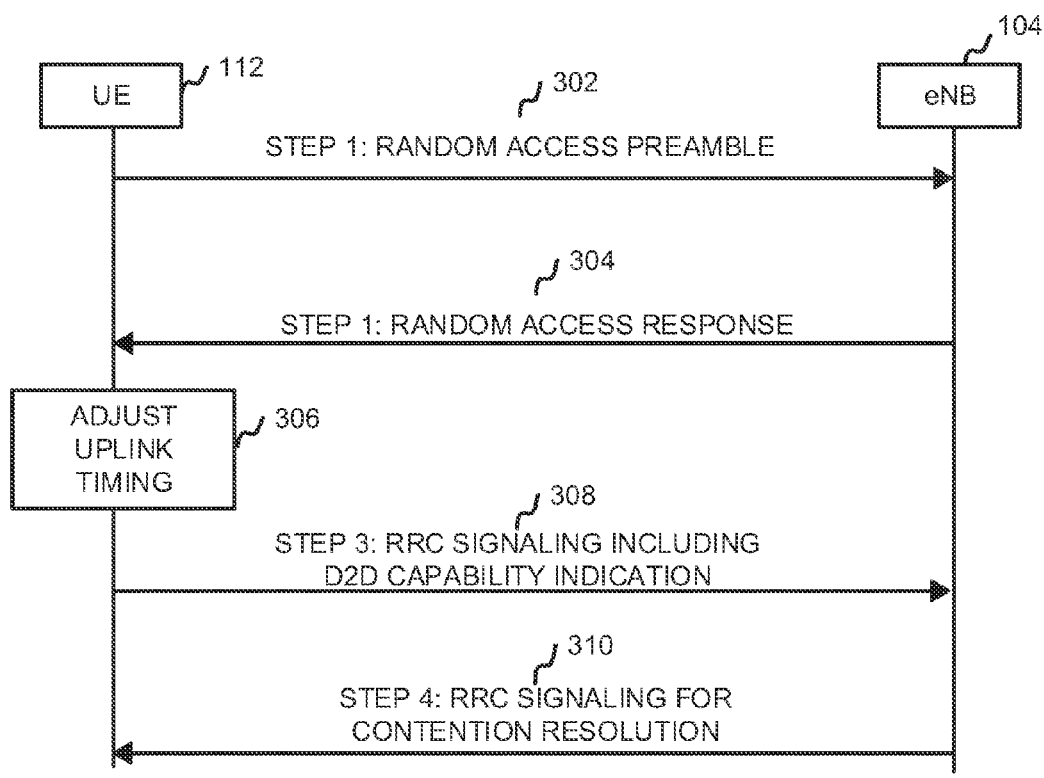
FIG. 3B illustrates the use of a random-access channel (RACH) to count ProSe-enabled UEs in accordance with some embodiments.

FIG. 3B illustrates the use of a random-access channel (RACH) to count ProSe-enabled UEs in accordance with some embodiments. In these embodiments, the eNB 104 may determine the number of ProSe-enabled UEs 102 based on radio-resource control (RRC) signaling (operation 308) received from the ProSe-enabled UEs 102 during a contention-based random access (CBRA) procedure 300 as part of an initial access procedure. The RRC signaling may, for example, include a D2D capability indication of the transmitting ProSe-enabled UE 102. In these embodiments, the eNB 104 may determine whether or not to make changes to a resource allocation configuration for D2D activities based on the discovery zone loading metrics and the number of ProSe-enabled UEs 102 determined based on the RRC signaling.

In these embodiments, the RACH is used for D2D UEs counting: Counting of ProSe-enabled (i.e., D2D capable) UEs is performed during UE's initial Contention-Based Random Access (CBRA) procedure (operations 302, 304, 306, 308 and 310). In these embodiments, a UE's ProSe-capability may be included in the message transmitted operation 308. These embodiments may be used to count RRC_CONNECTED as well as RCC_IDLE mode UEs.

Figure 4:
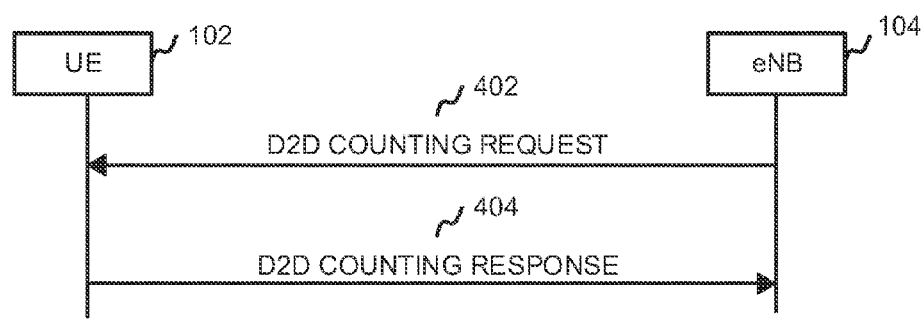
FIG. 4 illustrates a procedure for counting ProSe-enabled UEs for UEs in radio-resource control (RRC) connected mode.

FIG. 4 illustrates a procedure for counting ProSe-enabled UEs for UEs in radio-resource control (RRC) connected mode. In these embodiments, an eNB 104 may be configured to transmit a D2D counting request message (operation 402) and receive a D2D counting response message (operation 404) from ProSe-enabled UEs 102 that are in radio-resource control (RRC) connected mode. In these embodiments, the D2D counting response message 404 may indicate that the responding UE is a ProSe-enabled UE allowing the eNB 104 to coarsely estimate the number of ProSe-enabled UEs based on the number of D2D counting response messages 404 that are received. In some of these embodiments, a D2D counting response message 404 may be indicate that a UE in RRC connected mode is not ProSe-enabled.

In some embodiments, the D2D counting request message (operation 402) may include plurality of dedicated RACH preambles allocated for D2D counting and the D2D counting response message (operation 404) may comprise one of the RACH preambles selected by a ProSe-enabled UE 102 and transmitted within an assigned access slot (e.g., a RACH time/frequency resource).

In these embodiments, a set of dedicated RACH preambles may be included in D2D counting request message. Upon receiving a counting request from the network for D2D counting purpose, a D2D-capable UE responds by sending a RACH preamble selected from the pool of RACH preambles allocated for D2D UE counting purpose; the UE transmits the selected preamble on the assigned access slot (RACH channel time/frequency resource). Note that, a relatively coarse estimation of the number of D2D-capable UEs may be sufficient to determine whether D2D discovery resources need to added or reduced compared to the current configuration (that may be achieved by comparing to a certain threshold number that relates to the current D2D resource configuration). A very accurate counting of larger numbers of UEs is not necessary. Therefore by allocating a number of preamble signature-timeslot combinations similar to or only a little greater than this threshold number, it is straightforward to derive the required information.

In these embodiments, counting the D2D capable UEs in RRC_CONNECTED mode might be sufficient in some cases for optimized discovery resources allocation due to the fact that discovery signal resources is typically allocated in a semi-static manner and any RCC_IDLE Mode D2D capable UE has to use the contention-based resources for D2D discovery due to lack of RRC context in the radio-access network. The network has the capability to gradually adjust the resources according to the detected statistics of the D2D resource utilization and the likelihood of collisions. Therefore, as defined as part of the MBMS counting procedure, the E-UTRAN first initiates the procedure by sending a D2DCountingRequest message. Upon receiving the D2DCountingRequest message, the UE capable of D2D discovery in RRC_CONNECTED mode shall transmit a D2DCountingResponse message.

In some embodiments, an eNB may determine the number of ProSe-enabled UEs 102 based on RRC messages indicating discovery resource release transmitted by ProSe-enabled UEs in RRC_connected mode. In some of these embodiments, ProSe-enabled UEs in RRC_CONNECTED mode can transmit an RRC message indicating discovery resource release even if they have not yet been configured with dedicated discovery resources. This information can assist the eNB in estimating the number of ProSe-enabled UEs in RRC_CONNECTED mode participating in D2D discovery, and can thereby optimize the resource allocation for RRC_CONNECTED mode UEs.

In some embodiments the eNB may determine the number of ProSe-enabled UEs 102 based on reception of periodic tracking area (TA) messages having a D2D capability indication transmitted by ProSe-enabled UEs in RRC idle mode. In these embodiments, ProSe-enabled UEs in RRC idle mode may be configured to add the D2D capability indication to the periodic tracking area (TA) messages.

In some embodiments, a ProSe-enabled UE may be configured to receive device-to-device (D2D) discovery zone configuration signaling from an enhanced node B (eNB) to indicate time and frequency resources and a periodicity of a discovery zone and to indicate one or more discovery zone operational parameters. In some embodiments, when a UE is in radio-resource control (RRC) idle mode (RCC_IDLE), the UE may transition to RRC connected mode (RRC_CONNECTED) to send a discovery resource request to the eNB. The UE may autonomously switch back to the RRC idle mode upon reception of a resource configuration message from the eNB, at least for transmission in a contention-based D2D discovery zone (CB-D2D DZ).

In some embodiments, an eNB 104 may be configured to exchange D2D discovery zone configuration information with one or more neighbor eNBs. The eNB 104 may be configured to signal the D2D discovery zone configuration information of the one or more neighbor eNBs to ProSe-enabled UE (e.g., via SIB signaling). In these embodiments, a certain level of coordination between the neighboring eNBs may support of inter-eNB discovery, especially for the case of cell-specific configuration of D2D discovery zones. In some embodiments, eNBs 104 may exchange information on the configuration of D2D discovery zones in their respective cells. The D2D discovery configuration of a neighboring cell may be signaled to the UEs 102 by the respective serving cells. In some alternate embodiments, the serving cell may inform the UEs about the location of the relevant system information block (SIB) transmitted by the neighboring cells and the UEs may acquire the corresponding SIB and thereby know the D2D discovery zone configuration in neighboring cells. For both cases, it may be up to UE implementation, especially for UE-based open discovery, as to whether to transmit and/or listen on the D2D discovery zones (that do not overlap with its serving cell D2D discovery zone) of all the cells in its neighbor cell list of only a selected subset thereof.

For network-common configuration of D2D discovery zones, constituent cells may be configured to maintain tight time-synchronization with respect to subframe boundary, subframe number (SFN), etc. to enable a common D2D discovery zone. This may be achieved, for instance, using backhaul-based synchronization or using GPS. In some embodiments, the requirements on tight time-synchronization may be relaxed by using an extended cyclic prefix (CP) for the D2D discovery zones and using a normal-length cyclic prefix for non-discovery zones.

For D2D discovery zones that are configured on a cell-specific basis, one challenge arises from the issue of coexistence of D2D discovery transmission/reception and cellular (WAN) traffic. Since the D2D discovery zones are configured in the currently defined UL subframes, the inter-cell interference between D2D discovery signal transmissions and UL PUSCH transmissions may be managed, for example, by UL scheduling and UL power control for PUSCH transmissions, incorporating some form of transmit power control (e.g., by configuring the maximum transmit power) for transmission of discovery signals, employing a cell-clustering approach, and/or the selection of discovery resources by the UE based on UE geometry. These embodiments are discussed in more detail below.

In some embodiments, to signal the D2D discovery zone configuration information of the one or more neighbor eNBs, the eNB 104, when operating as a serving eNB is configured to provide location information for system information blocks (SIB) transmitted by one or more neighboring eNBs to allow UEs being served by the serving eNB to acquire the SIBs, the SIBs indicating D2D discovery zone configuration for the one or more neighboring eNBs. In these embodiments, it may be up to the UE implementation, especially for UE-based open discovery, as to whether to transmit and/or listen on the D2D discovery zones (that do not overlap with its serving cell D2D discovery zone) of all the cells in its neighbor cell list of only a selected subset thereof. In these embodiments, the UE may receive the signaling from a serving eNB when in RRC connected mode and may receive the signaling from an eNB that the UE is camping on when the UE is in RRC idle mode. In accordance with embodiments, a UE has a serving eNB when in RRC connected mode, while when in RRC idle mode, the UE camps on an eNB (since it is not being service by an eNB when in idle).

In some embodiments, an eNB 104 is configured to exchange D2D discovery zone configuration information one or more neighbor eNBs. Based the D2D discovery zone configuration information of the one or more neighbor eNBs, the eNB 104 may be configured to engage in an inter-cell interference reduction technique to reduce intra-cell and inter-cell interference within the discovery zone and inter-cell interference between discovery signal transmissions and uplink cellular transmissions. The inter-cell interference reduction technique include one or more of:

- performance of cooperative subframe power control for D2D discovery signal transmissions wherein uplink subframe sets are configured with separate power control parameters for interference reduction between the uplink cellular transmissions (e.g., physical uplink shared channel (PUSCH) transmissions) and the D2D discovery signal transmissions;
- configuration of transmit power control levels for transmission of discovery signals;
- employment of cooperative cell clustering to align discovery zones of the one or more neighbor eNBs; and
- employment of geometry-based intra-cell discovery zone partitioning.

Figure 5:
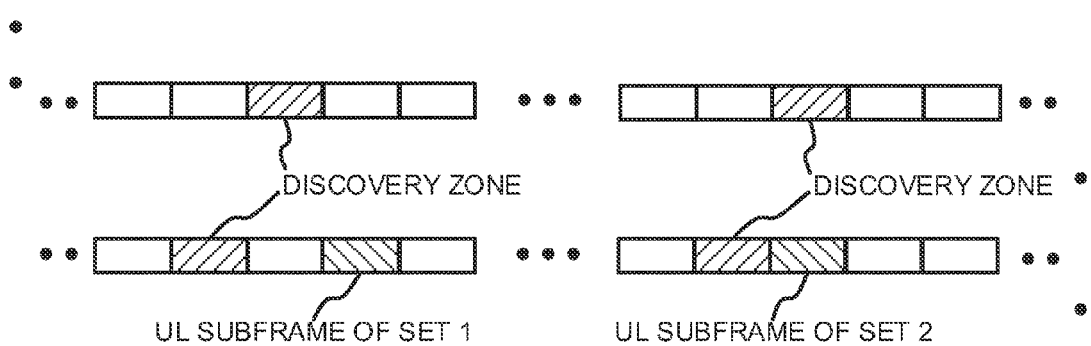
FIG. 5 illustrates cooperative uplink subframe power control for D2D discovery signal transmission in accordance with some embodiments.

FIG. 5 illustrates cooperative uplink subframe power control for D2D discovery signal transmission in accordance with some embodiments. In some of these embodiments, UL scheduling and power control for PUSCH transmissions may be configured by the serving cell as the configuration of the D2D discovery zone in the neighboring cells is known by the serving cell. In some embodiments, two UL subframe sets may be configured to have separate power control parameters (e.g. open-loop power control parameters P0 and alpha) for different UL subframe sets. This may avoid strong inter-cell interference from cellular PUSCH transmission to D2D discovery signal reception of neighboring cell by using one UL subframe set to cover the D2D discovery resources of neighboring cells) as illustrated in FIG. 5.

Some embodiments may incorporate a form of transmit power control (e.g., by configuring the maximum transmit power) for transmission of discovery signals. In some embodiments, multiple maximum power classes for D2D discovery signal can predefined and the selected maximum transmit power level may be signaled to UE through D2D discovery configuration signaling.

Some embodiments may employ a cell-clustering approach whereby neighboring cells align their D2D discovery zone configurations via information exchange via X2 115 (FIG. 1). In these embodiments, only the time-frequency resources reserved for D2D discovery zones may need to be aligned and each cell can configure a silencing factor (discussed in more detail below) independently to adjust for variations in the loading of the D2D discovery zones to manage intra-cell/intra-cluster interference within the D2D discovery zones.

In some embodiments, the discovery zone operational parameters may include at least one of a silencing factor, a transmit power control configuration, hopping related parameters and a scrambling ID. In these embodiments, irrespective of the type of D2D discovery operation: open or restricted discovery, for RRC_CONNECTED or RCC_IDLE ProSe-enabled UEs, certain parameters related to configuration and transmission of discovery zones and signals (e.g., discovery packets) may be signaled to the corresponding UEs.

In these embodiments, the discovery zone configuration may include any partitioning of the overall zone into contention-based and contention-free discovery zones. Parameters may be included to indicate the extent of each discovery zone in the time and frequency domains, and may indicate a time offset and a periodicity of the configuration of the zones. For a cell-specific discovery zone allocation, this information would be cell specific and a serving cell may signal the parameters corresponding to the neighboring cells to support inter-eNB discovery.

In some embodiments, if fixed random silencing is configured, a single value for the silencing factor may be signaled. On the other hand, for support of more advanced adaptive silencing mechanisms, more than one parameter may need to be signaled. In one embodiment, each ProSe-enabled UE 102 may be configured with a nominal silencing factor that is applied for the first occurrence of the discovery zone for the respective UE. For the subsequent discovery zone occurrences, the silencing factor to be applied by the UE may be incremented or decremented within certain lower and upper bounds (by certain factors signaled by the network/eNB) depending on whether the UE transmitted in the previous zone or not. The bounds may either be static (preconfigured) or configured and updated by the network and/or the eNB at a very slow rate, although the scope of the embodiments is not limited in this respect.

In some embodiments, the eNB may be configured to reduce interference within the discovery zone by employing a silencing and muting protocol for discovery signal transmissions and configured to include the silencing factor in the discovery zone parameters. In these embodiments, the silencing and muting protocol configures the ProSe-enabled UEs with the silencing factor for use in D2D discovery signal transmission on randomly selected resources of the D2D discovery zone based on a probability indicated by the silencing factor. The effective arrival rate of the discovery packets and thereby the interference level within the D2D discovery zones may be controlled. In these embodiments, each ProSe-enabled UE that intends to transmit a discovery packet may randomly selects a resource from within the D2D discovery zone and may transmit the packet with a certain probability (e.g., (1-p), with $0 \leq p \leq 1$). In these embodiments, p may be defined as the silencing factor that is configured by the network, either in a network-common manner or in a cell-specific manner by individual serving cells. Alternatively, the silencing factor can be represented by the subtracting the transmission probability factor from 1, since the transmission probability factor is defined as 1 minus the silencing factor.

In some embodiments, the signaling to the UE indicates that the silencing factor is to be either incremented or decremented for use in subsequent discovery periods of the discovery zone depending on whether the UE transmitted D2D discovery signals in a prior discovery period of the discovery zone.

There are a number of ways to estimate a loading condition of the D2D discovery zone. The loading condition, in turn, can be used to help determine how to adjust an adaptable silencing factor for a subsequent DZ. In one embodiment (option 1), ProSe-enabled UEs can count the number of successful cyclic redundancy checks (CRCs) when decoding a discovery packet from other UEs in the current D2D discovery zone this count of successful CRCs can be denoted by $I_{CRCsucc}$. A threshold number $Thres_{CRCsucc}$ can be defined such that, when $I_{CRCsucc}$ is greater than $Thres_{CRCsucc}$, UEs can consider the current discovery zone to be heavily loaded and will increase the silencing factor by an amount $q_0$ for the next discovery zone. On the other hand, if $I_{CRCsucc}$ is less than or equal to $Thres_{CRCsucc}$ in for the current discovery zone, UEs can decrease the silencing factor by an amount $q_1$ for the next discovery zone. The threshold number $Thres_{CRCsucc}$ can be either static or configured and updated by the network at a slow rate.

In an embodiment (option 2) directed to contention-based discovery, ProSe-enabled UEs may randomly select demodulation reference signal (DM-RS) sequences or discovery preambles when transmitting a discovery packet. On the receiving end, UEs receiving discovery transmissions may need to perform discovery-preamble detection or packet detection in order to ascertain whether a discovery packet is present in a given discovery resource and perform DM-RS identification to ensure appropriate channel estimation and timing/frequency offset compensation. When performing discovery-preamble detection or packet detection including DM-RS blind detection, ProSe-enabled UEs can calculate the correlation energy of all candidate DM-RS sequences and select the DM-RS sequence with the highest correlation energy for further baseband processing.

In an additional embodiment directed to contention-based discovery, a ProSe-enabled UE may first determine a maximum correlation energy of all candidate DM-RS sequences within each monitored discovery resource. The average maximum correlation energy across all monitored discovery resources in a discovery zone (e.g., discovery period), herein called $MaxEn_{DZ}$, can be determined subject to a half-duplex constraint. A threshold value, herein called $Thres_{MAXENDR}$, selected. If $MaxEn_{DZ}$ is greater than or equal to $Thres_{MAXENDR}$ for the current discovery zone, the UE can consider the current discovery zone to be heavily loaded with discovery packet transmissions and can increase the silencing factor by an amount $q_0$ for the next discovery zone. Conversely, if $MaxEn_{DZ}$ is less than $Thres_{MAXENDR}$ for the current discovery zone, the UE can decrease the silencing factor by an amount $q_1$ for the next discovery zone. $Thres_{MAXENDR}$ can be either static or configured and updated by the network at a slow rate.

In another embodiment (option 3), a ProSe-enabled UE can calculate the maximum and second-maximum (i.e., second highest) correlation energies of candidate DM-RS sequences within each monitored discovery resource. The UE can then calculate an average of the second-maximum correlation energies, herein called $MaxSecMaxEn_{DZ}$, across all monitored discovery resources in a discovery zone subject to a half-duplex constraint. A threshold value, herein called $Thres_{MAXSECMAXENDR}$, selected. If $MaxSecMaxEn_{DZ}$ is greater than or equal to $Thres_{MAXSECMAXENDR}$ for the current discovery zone, the UE can consider the current discovery zone to be heavily loaded with discovery packet transmissions and can increase the silencing, factor by an amount $q_0$ for the next discovery zone. Conversely, if $MaxSecMaxEn_{DZ}$ is less than $Thres_{MAXSECMAXENDR}$ for the current discovery zone, the UE can decrease the silencing factor by an amount $q_1$ for the next discovery zone. $Thres_{MAXSECMAXENDR}$ can be either static or configured and updated by the network at a slow rate.

In another embodiment (option 4), calculate the maximum and second-maximum (i.e., second highest) correlation energies of candidate DM-RS sequences within each monitored discovery resource. The UE may then calculate a ratio between the maximum and second-maximum correlation energies within each monitored discovery resource and compare this calculated ratio to a threshold ratio (herein called $Thres_{ratioDR}$). The UE can then calculate a count of the number of discovery resources (in the current discovery zone) for which the calculated ratio is greater than or equal to $Thres_{ratioDR}$. An average count across all monitored discovery resources within a discovery period subject to a half-duplex constraint can be determined, herein referred to as $I_{ratio}$. $I_{ratio}$ can then be compared to a threshold value, herein called $Thres_{ratioDZ}$. If $I_{ratio}$ is less than $Thres_{ratioDZ}$ for the current discovery zone, the UE can consider the current discovery zone to be heavily loaded with discovery packet transmissions and can increase the silencing factor by an amount $q_0$ for the next discovery zone. Conversely, if $I_{ratio}$ is greater than or equal to $Thres_{ratioDZ}$ for the current discovery zone, the UE can decrease the silencing factor by an amount $q_1$ for the next discovery zone. $Thres_{ratioDZ}$ can be either static or configured and updated by the network at a slow rate.

In another embodiment (option 5), a plurality of the options 1-4 can be used in combination to derive a composite metric to estimate the loading condition in a discovery zone. An additional option of considering whether the UE transmitted in previous discovery zone may also be used in conjunction with any combination of options 1-4 to derive such a composite metric. A threshold value, herein referred to as $Thres_{comb}$, can be selected for the composite metric. If a current discovery zone's value for the composite metric is greater than or equal to $Thres_{comb}$, the UE can consider the current discovery zone to be heavily loaded with discovery packet transmissions and can increase the silencing factor by an amount $q_0$ for the next discovery zone. Conversely, if the current discovery zone's value for the composite metric is less than $Thres_{comb}$, the UE can decrease the silencing factor by an amount $q_1$ for the next discovery zone. $Thres_{comb}$ can be either static or configured and updated by the network at a slow rate.

In another embodiment, one or more of the criteria listed above (e.g., options 1-5) can be used as parameters for functions that define the increment factor $q_0$ and the decrement factor $q_1$. A predefined function $f$ for example, can receive criteria as parameters and use these parameters to determine a value for the increment factor $q_0$ that is used to adjust the silencing factor for a subsequent discovery zone. A predefined function g, in another example, can receive criteria as parameters and use these parameters to determine a value for the decrement factor $q_1$ that is used to adjust the silencing factor for a subsequent discovery zone.

In embodiments that estimate the loading condition of the D2D discovery zone and adapt the silencing factor, the silencing factor can be constrained to fit a lower bound and/or an upper bound. Such a lower bound and/or upper bound can be either static or configured and updated by the network at a slow rate.

In some embodiments, ProSe-enabled UEs can be allowed to transmit multiple copies of discovery packets within the same discovery zone. In embodiments where this is permitted, discovery zones can be divided into sub-discovery zones (sub-DZs). The schemes to adapt the silencing probability, as described in options 1-5, can be applied using sub-discovery zones (sub-DZs) in place of DZs.

In some embodiments, a conditional silencing probability $p_{reTx}$ can be defined for a retransmission within a DZ. This conditional silencing probability can be conditioned on the event that the UE transmits the initial discovery signal in the DZ. If the initial discovery signal is actually transmitted during the DZ, one or more subsequent retransmissions of the discovery signal could be transmitted with probability $p_{reTx}$. The conditional silencing probability $p_{reTx}$ can be either static or configured and updated by the network at a slow rate.

In another embodiment, different types of D2D discovery messages can have different sizes. Discovery packets for public safety (PS) and non-PS D2D discovery messages, for example, typically have different sizes. A ProSe-enabled UE may be configured to transmit/retransmit a discovery packet a different number of times in a DZ (or a sub-DZ) depending on the size of the discovery packet. A fixed or adaptive silencing factor can be applied to an initial discovery signal transmission, a retransmission, or both. The approaches described above (e.g., in options 1-5) can be used to adjust an adaptive silencing factor based on loading conditions.

In another embodiment, the approaches described above (e.g., in options 1-5) can be used to estimate loading conditions within a set of discovery periods. The comparison metrics described in options 1-5, for example, can be averaged over n previous discovery periods in a discovery zone in order to have a larger sample size of discovery periods from which to estimate current loading conditions. The set of n previous discovery periods may comprise a sliding window of discovery periods such that, to estimate loading conditions for a discovery period t, metrics from discovery periods t-n through t-1 are included in the set.

In some embodiments, when the discovery zone parameters include the transmit power control configuration, a UE may be configured with a maximum transmit power for transmission of D2D discovery signals that is lower than a transmit power specified by a respective UE category. In these embodiments, depending on the discovery traffic conditions and use cases, ProSe-enabled UEs may be configured with a maximum transmit power that may be lower than that specified by the respective UE category. The maximum transmit power may be applied for discovery packet transmission. If supported, additional parameters related to more advanced adaptive power control options would need to be signaled as well.

In some embodiments, when the discovery zone parameters comprise include the hopping related parameters, the hopping related parameters indicate:
  parameters for discovery resource hopping in a contention-free D2D discovery zone configuration;
  a hopping type comprising either type 1 or type 2 hopping;
  a hopping mode comprising either intra-subframe or inter-subframe hopping;
  a subband size for the type 2 hopping; and
  a pseudorandom sequence initialization for the type 2 hopping.

In these embodiments, for contention-free discovery resource allocations, certain randomized hopping related signaling may be provided to the UE. Further, for payload-based transmissions wherein the each discovery packet transmission spans multiple PRB-pairs, different types of intra- or inter-subframe hopping may be configured.

In some embodiments, when the discovery zone parameters comprise include the scrambling identity, the scrambling identity may to be used for scrambling of a CRC mask of the D2D discovery packets. A common scrambling ID may be assigned per discovery group. In these embodiments, a scrambling Identity (ID) may be used for scrambling of the CRC mask of the discovery packets. The scrambling identity may be common per discovery group. For open discovery, all ProSe-enabled UEs within the network (for network-common discovery resource configuration) or within cells or cell-clusters (for cell-specific discovery resource configuration) may be configured with a common scrambling ID.

For restricted discovery, the scrambling ID may be used for filtering of decoded candidates by the discovering UE before sending the list of candidates to the upper layers for verification for restricted discovery. For closed discovery, the scrambling is the same on a per-white list basis for restricted discovery. In this way, those ProSe-enabled UEs that are not on white list will not be able to decode the packet. The closed group scrambling seed should be generated by the D2D server, and sent together with the white list group information during D2D registration (not through SIB/paging).

In some embodiments, for restricted discovery, a temporary identifier (Temp_ID) may be used to differentiate the same ProSe-enabled UE belonging to different discovery groups (different white lists of other ProSe-enabled UEs). Each ProSe-enabled UE transmitting as part of restricted discovery is assigned with one or more Temp_IDs that replace the UE identity in the discovery packet. When a discovering UE decodes such a packet, it forwards the decoded Temp_ID(s) to the network for further identification and verification as part of the restricted discovery process. For example, consider three ProSe-enabled UEs participating in restricted discovery: UE_A, UE_B, and UE_C. UE_A and UE_B belong to distinct groups A and B respectively and don not have each other in their respective white lists, while UE_C is in both the white lists. Then, UE_C may be assigned two distinct Temp_IDs (UE_Ca and UE_Cb) such that both UE_A and UE_B can discover UE_Ca and UE_Cb respectively, and thereby, with subsequent identification from the network, can discover UE_C. However, UE_A and UE_B can only discover each other via open discovery operation.

Figure 6:
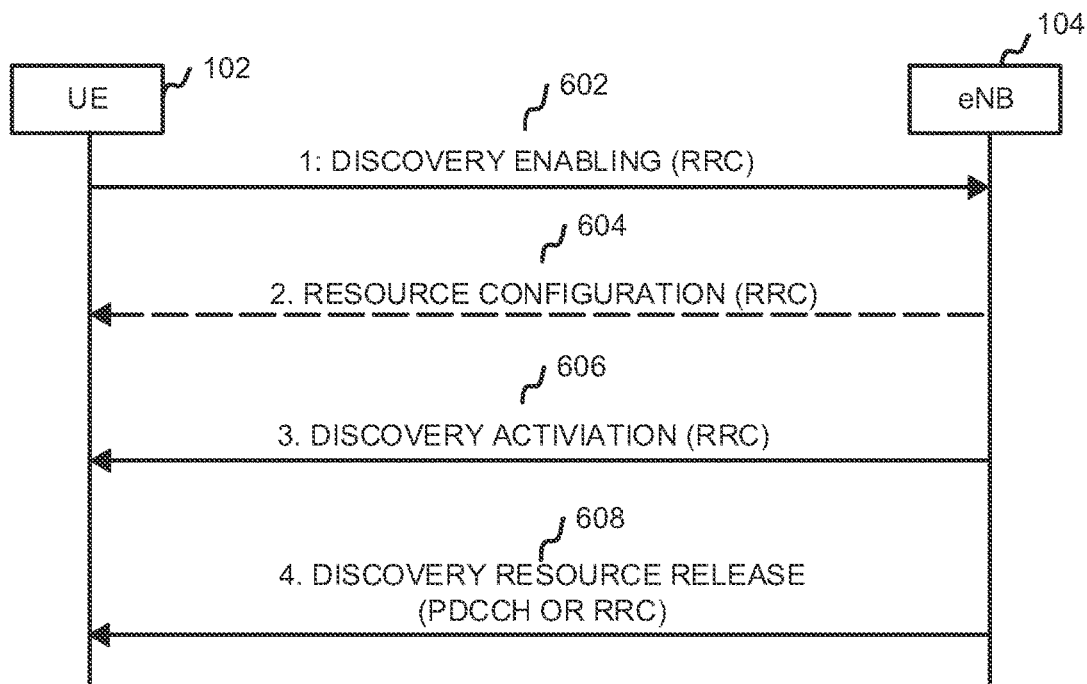
FIG. 6 illustrated eNB-triggered contention-free D2D discovery zone resources in accordance with some embodiments.

FIG. 6 illustrated eNB-triggered contention-free D2D discovery zone resources in accordance with some embodiments. In these embodiments, an eNB may use RRC and/or Layer 1 (physical layer) signaling to indicate a semi-persistent allocation of discovery resources to a ProSe-enabled UE in RRC connected mode for contention-free transmission of D2D discovery signals. The eNB may be configured to release the allocation of discovery resources by transmission of a discovery resource release. In these embodiments, contention-free mode of D2D discovery may be supported in multiple ways. In some embodiments, this mode of operation may be triggered by the eNB (operation 602) in which the eNB configures one or more RRC_CONNECTED mode ProSe-enabled UEs with dedicated resources for transmission of discovery signals in operation 604. The resource allocation in this case may be realized in the form of semi-persistent allocation of discovery resources using a combination of RRC and Layer 1 signaling (operation 606). The configured dedicated resources may also be released (operation 608) by the eNB depending on the loading and overall D2D discovery resource allocation state.

Figure 7:
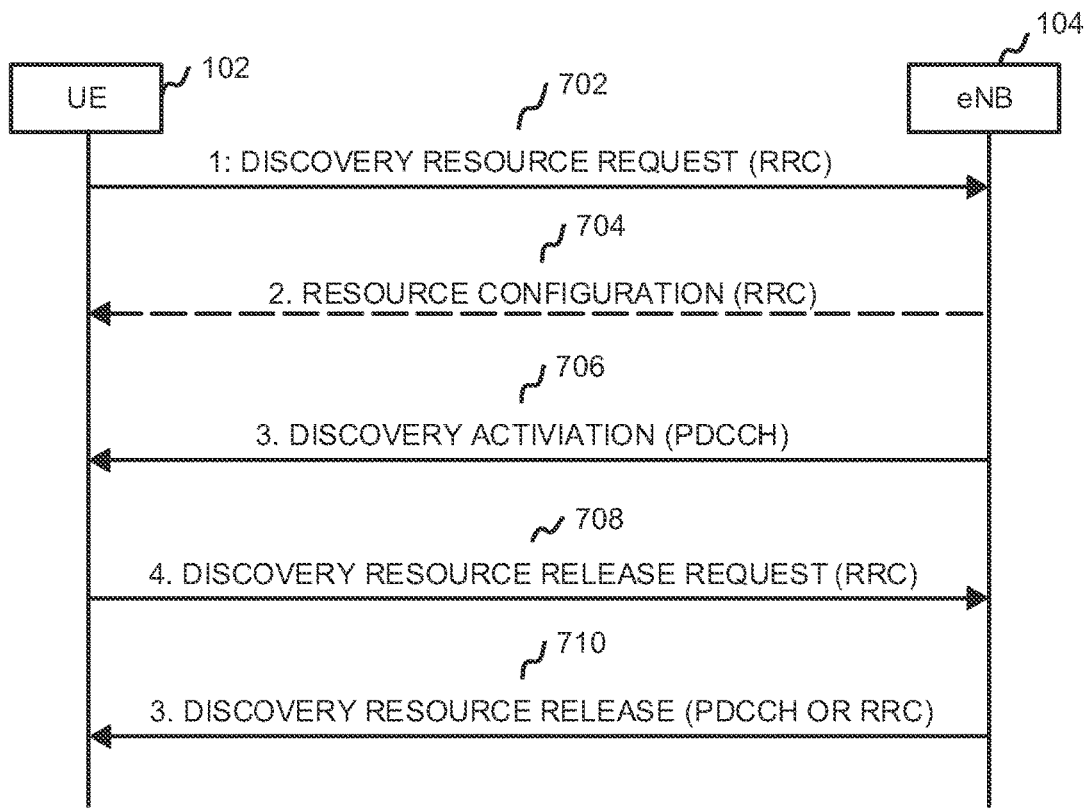
FIG. 7 illustrated UE-triggered contention-free D2D discovery zone resources in accordance with some embodiments.

FIG. 7 illustrated UE-triggered contention-free D2D discovery zone resources in accordance with some embodiments. In these embodiments, an eNB may allocate discovery resources to a ProSe-enabled UE in RRC connected mode for contention-free transmission of D2D discovery signals in response to a RRC resource request from the ProSe-enabled UE. In addition to eNB-decided discovery resource release, the eNB may release the allocation of discovery resources in response to reception of a resource release request via RRC signaling from the ProSe-enabled UEs. In these embodiments, an RRC_CONNECTED UE, for example, on initiation from higher layers, may request (operation 702) the serving cell for resources for D2D discovery signal transmissions via RRC layer. Subsequently, subject to eNB decision, the serving cell may configure the UE via RRC signaling with the configuration of the resource allocation (operation 704) and eventually semi-persistent allocations via Layer 1 signaling. The layer 1 signaling/activation is no used since resources may be configured via RRC (operation 704) and then the discovery transmission automatically gets activated starting from the next occurrence of the discovery resource pool/zone (operation 706). In addition to eNB-decided release of the resources (operation 710), a UE can also request for discovery resource release via RRC layer (operation 708).

In these embodiments, when the D2D discovery resources are explicitly allocated via PDCCH, the RRC resource configuration (operation 704) may not be required. Combinations of eNB-triggered, UE-triggered contention-free resource allocation schemes with eNB-decided and UE-requested resource release mechanisms may be realized as well.

Additionally, resources for D2D discovery may not be reserved (i.e., no discovery zones configured) at a cell-/cell-cluster-level or network-level depending on presence of active ProSe-enabled UEs. In such a situation, a ProSe-enabled UE in RRC_CONNECTED mode can send a request for allocation of D2D discovery resources via RRC or application layer. If it is requested via application layer, this request will be sent to D2D server which, in turn, requests the eNB to turn on discovery zone or allocate additional resources for contention-free discovery as required. Also, a ProSe-enabled UE in RCC_IDLE mode can transit, to connected mode to send discovery resource request. However, it may not involve RRC connection set up. For example, the UE can send RRC connect request only indicating discovery zone request. Alternatively, the UE autonomously goes to idle mode when the eNB sends acknowledgement (or discovery radio resource configuration) message for the discovery request message.

In some embodiments, D2D discovery resources may be statically provisioned. For support of D2D discovery for national security and public safety (NSPS) use cases in outside or partial network coverage scenarios, certain periodic time-frequency resources may be pre-configured for the public safety (PS) ProSe-enabled UEs as D2D discovery resources. Such resources could be configured to have a low duty cycle and under appropriate conditions, depending on the exact D2D discovery protocol, additional resources may be allocated to supplement the preconfigured D2D discovery zones by coordinating UEs for partial or outside network coverage scenarios. The configuration of the additional resources can follow the principles outlined above with consideration of the presence of the statically preconfigured default D2D discovery zones.

In some embodiments, for geometry-based intra-cell D2D discovery zone partitioning, a UE may receive signaling from a serving eNB indicating D2D discovery zone configuration information of one or more neighbor eNBs including discovery resources of the D2D discovery zone used for at least one of cell-center D2D UEs and cell edge D2D UEs. The UE may select resources indicated for cell-center D2D UEs or cell edge D2D UEs for transmission of D2D discovery signals based at least on an RSRP of a serving eNB. In these embodiments, a UE may select a discovery resource based on UE geometry. The discovery zone may be divided and some of discovery resource is mainly used for cell-center UEs if these discovery resources are used for normal UL scheduling in neighboring cells. The ProSe-enabled UEs that have the ratio $RSRP_{serving}/RSRP_{strongest\_neighbor}$ greater than some pre-defined or configured threshold can transmit D2D discovery packets in the discovery zone reserved for cell-center ProSe-enabled UEs. In the above, $RSRP_{serving}$ is the serving cell RSRP and $RSRP_{strongest\_neighbor}$ corresponds to the RSRP for the link to the cell in the neighbor cell list with the maximum RSRP value. This geometry-based intra-cell D2D discovery zone partitioning coupled with careful scheduling of PUSCH transmissions in the cells with WAN traffic can enable co-existence of D2D discovery zones and LTE UL transmissions in neighboring cells. The eNBs can exchange information on the discovery resource used for cell center D2D UEs or cell edge D2D UEs. In some of these embodiments, the UE may selected the discovery resource based on $RSRP_{serving}$ instead of the ratio and would work similarly, especially in NWs with eNBs with similar transmission power (e.g., for macro-only networks.

Figure 8:
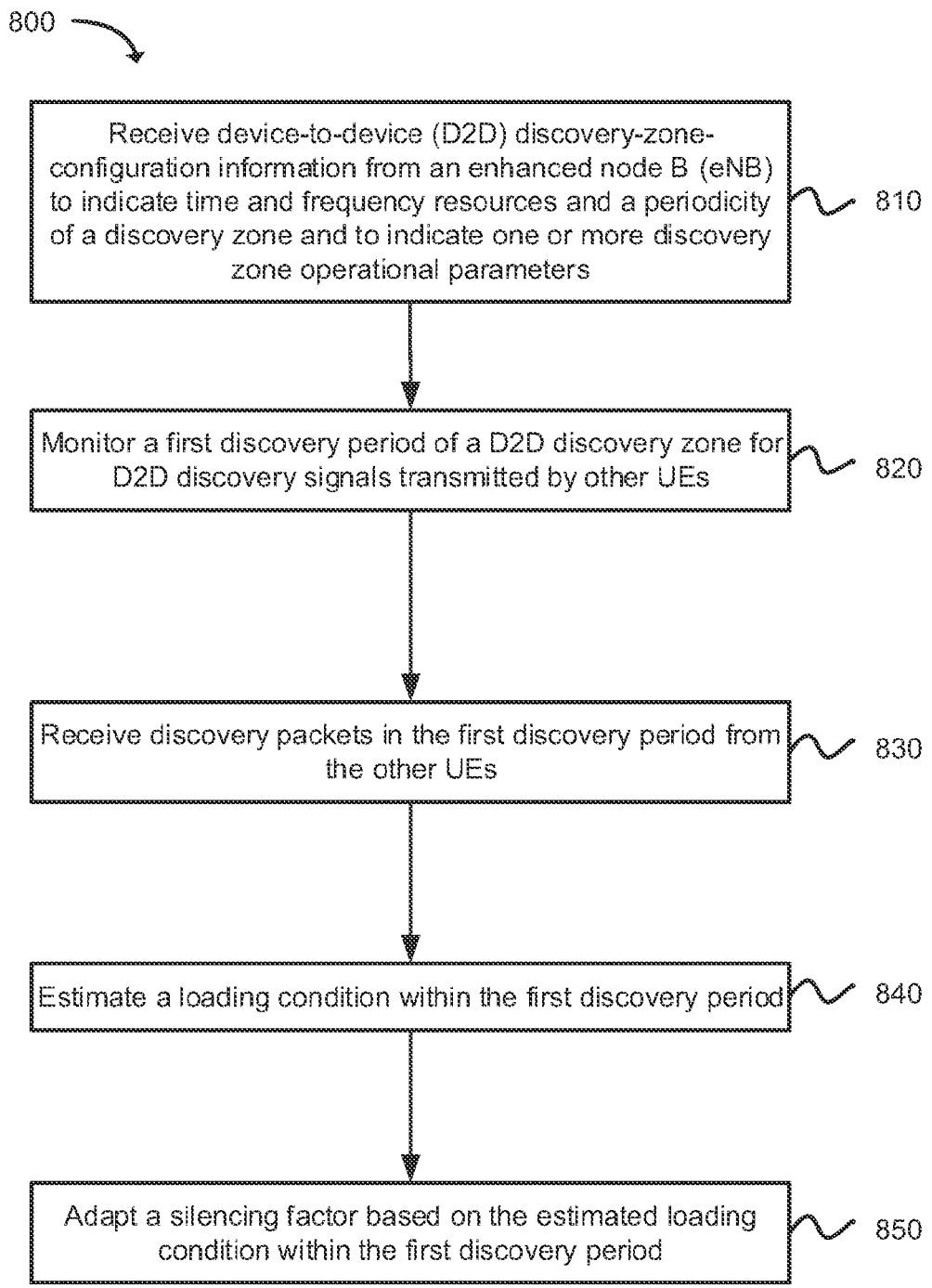
FIG. 8 illustrates functionality 800 of computer circuitry of a UE enabled for proximity services.

FIG. 8 illustrates functionality 800 of UE, enabled for proximity services (ProSe). As in 810, the ProSe-enabled UE can receive device-to-device (D2D) discovery-zone-configuration information from an enhanced node B (eNB) to indicate time and frequency resources and a periodicity of a discovery zone and to indicate one or more discovery zone operational parameters. As in 820, the ProSe-enabled UE can monitor a first discovery period of a D2D discovery zone for D2D discovery signals transmitted by other UEs. As in 830, the ProSe-enabled UE can receive discovery packets in the first discovery period from the other UEs. As in 840, the ProSe-enabled UE can estimate a loading condition within the first discovery period. As in 850, the ProSe-enabled UE can adapt a silencing factor based on the estimated loading condition within the first discovery period. The silencing factor can comprise a probability that the UE will not transmit a D2D discovery signal in a second discovery period that follows the first discovery period.

In one example, the ProSe-enabled UE can estimate the loading condition within the first discovery period of the discovery zone (e.g., a contention-based D2D discovery zone) by counting a number of successful cyclic redundancy checks (CRC) when decoding the discovery packets received from the other UEs subject to a half-duplex constraint; comparing the number of successful cyclic redundancy checks (CRC) to a threshold number (which may be static or periodically updated by a signal from an eNB); increasing the silencing factor if the number of successful cyclic redundancy checks (CRC) equals or exceeds the threshold number; and decreasing the silencing factor if the number of successful cyclic redundancy checks (CRC) is less than the threshold number.

In another example, the ProSe-enabled UE can estimate the loading condition within the first discovery period of the discovery zone a contention-based D2D discovery zone) by performing a discovery preamble detection or a discovery packet detection including demodulation and reference signal (DM-RS) blind detection; receiving a plurality of DM-RS sequences within each of a plurality of discovery resources located within the first discovery period; calculating correlation energies of all DM-RS sequences that comprise the plurality of DM-RS sequences within the first discovery zone; and selecting a DM-RS sequence from the plurality of DM-RS sequences within each of the plurality of discovery resources, where the selected DM-RS sequence has a maximum calculated correlation energy relative to the calculated correlation energies of all DM-RS sequences that comprise the plurality of DM-RS sequences that may be transmitted on the respective discovery resource.

The ProSe-enabled UE can also be configured to estimate the loading condition by calculating an average maximum correlation energy within the first discovery zone across all monitored discovery resources within a discovery period subject to a half-duplex constraint; comparing the average maximum correlation energy to a threshold correlation energy (which may be static or periodically updated by a signal from an eNB); increasing the silencing factor if the average maximum correlation energy is greater than or equal to the threshold correlation energy; and decreasing the silencing factor if the average maximum correlation energy is less than the threshold correlation energy.

The ProSe-enabled UE can also be configured to estimate the loading condition by selecting a second DM-RS sequence from the plurality of DM-RS sequences within each of a plurality of discovery resources located within the first discovery period, where the second DM-RS sequence has a second maximum calculated correlation energy relative to the calculated correlation energies of all of the DM-RS sequences that comprise the plurality of DM-RS sequences that may be transmitted on the discovery resource; calculating an average second maximum correlation energy within the first discovery zone across all monitored discovery resources within a discovery period subject to a half-duplex constraint; comparing the second maximum calculated correlation energy to a threshold correlation energy (which may be static or periodically updated by a signal from an eNB); increasing the silencing factor if the second maximum calculated correlation energy is greater than or equal to the threshold correlation energy; and decreasing the silencing factor if the second maximum calculated correlation energy is less than the threshold correlation energy.

In another example, ProSe-enabled UE can be configured to estimate the loading condition by performing discovery preamble or packet detection including demodulation reference signal (DM-RS) blind detection; receiving a plurality of DM-RS sequences in each of a plurality of discovery resources located within the first discovery period; calculating a correlation energy for each DM-RS sequence for each of the plurality of discovery resources located within the first discovery period; determining a maximum correlation energy for each discovery resource in the first discovery zone, wherein the maximum correlation energy for each of the plurality of discovery resources located within the discovery period comprises the maximum correlation energy of any DM-RS sequence that may be transmitted on the respective discovery resource; determining a second maximum correlation energy for each of the plurality of discovery resources located within the first discovery period; calculating a correlation-energy ratio for each of the plurality of discovery resources located within the first discovery period, wherein the correlation-energy ratio for a selected discovery resource comprises a ratio between the maximum correlation energy of the selected discovery resource and the second maximum correlation energy of the selected discovery resource; calculating a threshold-meet count for each discovery resource on each of the plurality of discovery resources located in the first discovery period, where the threshold-meet count for a selected discovery resource is incremented when the correlation-energy ratio of the selected discovery resource is greater than or equal to a threshold ratio (which may be static or updated periodically by a signal from an eNB); calculating an average threshold-meet count across all monitored discovery resources located within the first discovery zone; comparing the average threshold-meet count to a threshold number (which may be static or updated periodically by a signal from an eNB); increasing the silencing factor if the average threshold-meet count is less than the threshold number; and decreasing the silencing factor if the average threshold-meet count is greater than or equal to the threshold number.

In another example, the ProSe-enabled UE can be configured to estimate the loading condition by using a function that quantify the loading condition within the first discovery period receives input that comprises one or more of the following: an indicator that indicates whether the UE transmitted in a previous discovery period; a number of successful cyclic redundancy checks (CRC), wherein the hardware circuitry is further configured to count the number of successful CRC when decoding discovery packets received from the other UEs within the first discovery period; a maximum correlation energy within the first discovery zone, wherein the hardware circuitry is further configured to determine the maximum correlation energy by calculating correlation energies of a plurality of DM-RS sequences that are received at the UE on each of the plurality of discovery resources located within the first discovery period and setting the maximum correlation energy equal to a highest calculated correlation energy associated with a DM-RS sequence in the plurality of DM-RS sequences; a second maximum correlation energy within the first discovery zone, wherein the hardware circuitry is further configured to determine the second maximum correlation energy by calculating correlation energies of a plurality of DM-RS sequences that are received at the UE on each of the plurality of discovery resources located within the first discovery period and setting the second maximum correlation energy equal to a second-highest calculated correlation energy associated with a DM-RS sequence in the plurality of DM-RS sequences; or an average threshold-meet count, where the hardware circuitry is further configured to calculate the average threshold-meet count by counting a number of discovery resources on each of the plurality of discovery resources located in the first discovery period for which a ratio of a maximum correlation energy and a second-maximum correlation energy is greater than or equal to a threshold ratio and averaging over the number of discovery resources in the first discovery period of the discovery zone. The ProSe-enabled UE can increase the silencing factor when the loading condition quantified by the function is greater than or equal to a threshold value and decrease the silencing factor when the loading condition quantified by the function is less than the threshold value. These threshold values may be static or may be updated periodically by a signal from the UE. The silencing factor may be bounded by an upper-bound value and a lower-bound value. The silencing factor may be increased by an increment factor $Q_0$ when the loading condition quantified by the function is greater than or equal to a threshold value and decreased by a decrement factor $Q_1$ when the loading condition quantified by the function is less than the threshold value.

Figure 9:
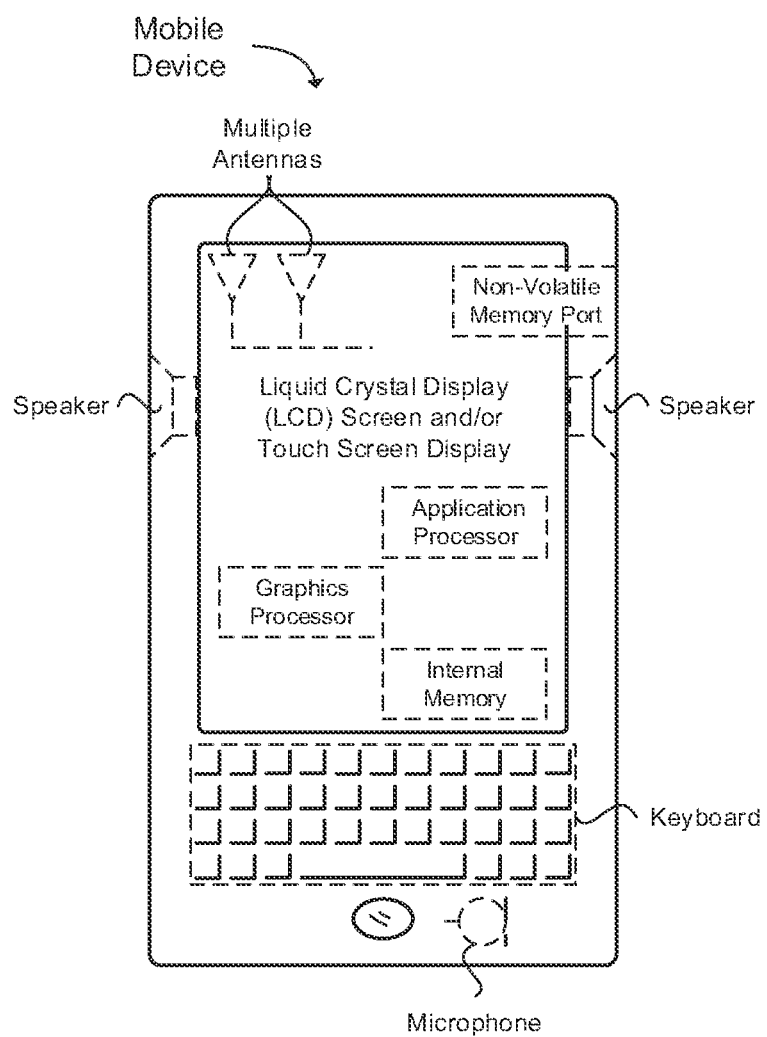
FIG. 9 illustrates a functional block diagram of a wireless communication device in accordance with some embodiments.

FIG. 9 provides an example illustration of the wireless device, such as a user equipment (UE), a mobile station (MS), a mobile wireless device, mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics may be combined in any suitable manner in one or more embodiments. In the following description, numerous specific details are provided, such as examples of layouts, distances, network examples, etc., to provide a thorough understanding of various embodiments. One skilled in the relevant art will recognize, however, that the claimed subject matter can be practiced without one or more of the specific details, or with other methods, components, layouts, etc. In other instances, well-known structures, materials, or operations are not shown or described in detail to avoid obscuring aspects of the claimed subject matter.

While the forgoing examples are illustrative of the principles of the present claimed subject matter in one or more particular applications, it will be apparent to those of ordinary skill in the art that numerous modifications in form, usage and details of implementation can be made without the exercise of inventive faculty, and without departing from the principles and concepts of the claimed subject matter. Accordingly, it is not intended that the claimed subject matter be limited, except as by the claims set forth below.

What is claimed is:

1. User equipment (UE) enabled for proximity services (ProSe), the ProSe-enabled UE comprising hardware circuitry configured to:
receive device-to-device (D2D) discovery-zone-configuration information from an enhanced node B (eNB) to indicate time and frequency resources and a periodicity of a discovery zone and to indicate one or more discovery zone operational parameters;
monitor a first discovery period of a D2D discovery zone for D2D discovery signals transmitted by other UEs;
receive discovery packets in the first discovery period from the other UEs;
estimate a loading condition within the first discovery period;
adapt a silencing factor based on the estimated loading condition within the first discovery period, where the silencing factor comprises a probability that the UE will not transmit a D2D discovery signal in a second discovery period that follows the first discovery period.

2. The UE of claim 1, wherein the hardware circuitry that is configured to estimate the loading condition within the first discovery period of the discovery zone is further configured to:
count a number of successful cyclic redundancy checks (CRC) when decoding the discovery packets received from the other UEs subject to a half-duplex constraint;
compare the number of successful cyclic redundancy checks (CRC) to a threshold number;
increase the silencing factor if the number of successful cyclic redundancy checks (CRC) equals or exceeds the threshold number; and
decrease the silencing factor if the number of successful cyclic redundancy checks (CRC) is less than the threshold number.

3. The UE of claim 2, wherein the threshold number is static.

4. The UE of claim 2, wherein the hardware circuitry is further configured to
periodically receive an updated threshold value from the enhanced node B (eNB); and
update the threshold number based on the updated threshold value.

5. The UE of claim 1, where the first and second discovery periods of the discovery zone are contention-based D2D discovery zones (CB-D2D DZs).

6. The UE of claim 1, wherein the hardware circuitry that is configured to estimate the loading condition within the first discovery period is further configured to:
perform a discovery preamble detection or a discovery packet detection including demodulation and reference signal (DM-RS) blind detection;
receive a plurality of DM-RS sequences within each of a plurality of discovery resources located within the first discovery period;
calculate correlation energies of all DM-RS sequences that comprise the plurality of DM-RS sequences within the first discovery zone; and
select a DM-RS sequence from the plurality of DM-RS sequences within each of the plurality of discovery resources, where the selected DM-RS sequence has a maximum calculated correlation energy relative to the calculated correlation energies of all DM-RS sequences that comprise the plurality of DM-RS sequences that may be transmitted on the respective discovery resource.

7. The UE of claim 6, wherein the hardware circuitry that is configured to estimate the loading condition within the first discovery zone is further configured to:
calculate an average maximum correlation energy within the first discovery zone across all monitored discovery resources within a discovery period subject to a half-duplex constraint;
compare the average maximum correlation energy to a threshold correlation energy;
increase the silencing factor if the average maximum correlation energy is greater than or equal to the threshold correlation energy; and
decrease the silencing factor if the average maximum correlation energy is less than the threshold correlation energy.

8. The UE of claim 7, where the threshold correlation energy is static.

9. The UE of claim 7, wherein the hardware circuitry is further configured to:
periodically receive a signal from an enhanced node B (eNB); and
update the threshold number based on the information from the eNB.

10. The UE of claim 6, further configured to:
select a second DM-RS sequence from the plurality of DM-RS sequences within each of a plurality of discovery resources located within the first discovery period, where the second DM-RS sequence has a second maximum calculated correlation energy relative to the calculated correlation energies of all of the DM-RS sequences that comprise the plurality of DM-RS sequences that may be transmitted on the discovery resource;
calculate an average second maximum correlation energy within the first discovery zone across all monitored discovery resources within a discovery period subject to a half-duplex constraint;
compare the second maximum calculated correlation energy to a threshold correlation energy;
increase the silencing factor if the second maximum calculated correlation energy is greater than or equal to the threshold correlation energy; and
decrease the silencing factor if the second maximum calculated correlation energy is less than the threshold correlation energy.

11. The UE of claim 10, where the threshold correlation energy is static.

12. The UE of claim 10, wherein the hardware circuitry is further configured to periodically receive a signal from an enhanced node B (eNB) and the UE updates the threshold number based on the signal from the eNB.

13. The UE of claim 1, further configured to:
perform discovery preamble or packet detection including demodulation reference signal (DM-RS) blind detection;
receive a plurality of DM-RS sequences in each of a plurality of discovery resources located within the first discovery period;
calculate a correlation energy for each DM-RS sequence for each of the plurality of discovery resources located within the first discovery period;
determine a maximum correlation energy for each discovery resource in the first discovery zone, wherein the maximum correlation energy for each of the plurality of discovery resources located within the discovery period comprises the maximum correlation energy of any DM-RS sequence that may be transmitted on the respective discovery resource;
determine a second maximum correlation energy for each of the plurality of discovery resources located within the first discovery period;
calculate a correlation-energy ratio for each of the plurality of discovery resources located within the first discovery period, wherein the correlation-energy ratio for a selected discovery resource comprises a ratio between the maximum correlation energy of the selected discovery resource and the second maximum correlation energy of the selected discovery resource;
calculate a threshold-meet count for each discovery resource on each of the plurality of discovery resources located in the first discovery period, where the threshold-meet count for a selected discovery resource is incremented when the correlation-energy ratio of the selected discovery resource is greater than or equal to a threshold ratio;
calculate an average threshold-meet count across all monitored discovery resources located within the first discovery zone;
compare the average threshold-meet count to a threshold number;
increase the silencing factor if the average threshold-meet count is less than the threshold number; and
decrease the silencing factor if the average threshold-meet count is greater than or equal to the threshold number.

14. The UE of claim 13, wherein the threshold ratio is static.

15. The UE of claim 13, wherein the threshold number is static.

16. The UE of claim 13, where the UE periodically receives a signal from an enhanced node B (eNB) and the UE updates the threshold ratio based on the signal from the eNB.

17. The UE of claim 13, where the UE periodically receives a signal from an enhanced node B (eNB) and the UE updates the threshold number based on the signal from the eNB.

18. A user equipment (UE) enabled for proximity services (ProSe), the ProSe-enabled UE comprising hardware circuitry configured to:
receive device-to-device (D2D) discovery zone configuration information from an enhanced node B (eNB) to indicate time and frequency resources and a periodicity of the discovery zone and to indicate one or more discovery zone operational parameters;
monitor a first discovery period of a D2D discovery zone for D2D discovery signals transmitted by other UEs;
receive discovery packets in the first discovery period from the other UEs;
quantify a loading condition within the first discovery period using a function, wherein the loading condition is associated with a metric; and
adapt a silencing factor based on the quantified loading condition within the first discovery period, wherein the silencing factor comprises the probability that the UE will not transmit a D2D discovery signal in a second discovery period that follows the first discovery period.

19. The UE of claim 18, where the function that is used to quantify the loading condition within the first discovery period receives input that comprises one or more of the following:
an indicator that indicates whether the UE transmitted in a previous discovery period;
a number of successful cyclic redundancy checks (CRC), wherein the hardware circuitry is further configured to count the number of successful CRC when decoding discovery packets received from the other UEs within the first discovery period;
a maximum correlation energy within the first discovery zone, wherein the hardware circuitry is further configured to determine the maximum correlation energy by calculating correlation energies of a plurality of DM-RS sequences that are received at the UE on each of the plurality of discovery resources located within the first discovery period and setting the maximum correlation energy equal to a highest calculated correlation energy associated with a DM-RS sequence in the plurality of DM-RS sequences;
a second maximum correlation energy within the first discovery zone, wherein the hardware circuitry is further configured to determine the second maximum correlation energy by calculating correlation energies of a plurality of DM-RS sequences that are received at the UE on each of the plurality of discovery resources located within the first discovery period and setting the second maximum correlation energy equal to a second-highest calculated correlation energy associated with a DM-RS sequence in the plurality of DM-RS sequences; or
an average threshold-meet count, where the hardware circuitry is further configured to calculate the average threshold-meet count by counting a number of discovery resources on each of the plurality of discovery resources located in the first discovery period for which a ratio of a maximum correlation energy and a second-maximum correlation energy is greater than or equal to a threshold ratio and averaging over the number of discovery resources in the first discovery period of the discovery zone.

20. The UE of claim 18, wherein the hardware circuitry is further configured to:
increase the silencing factor when the loading condition quantified by the function is greater than or equal to a threshold value and; and
decrease the silencing factor when the loading condition quantified by the function is less than the threshold value.

21. The UE of claim 20, where the hardware circuitry is further configured to:
not increase the silencing factor beyond an upper-bound value; and
not decrease the silencing factor beyond a lower-bound value.

22. The UE of claim 20, where the threshold value is static.

23. The UE of claim 20, where hardware circuitry is further configured to:
- periodically receive a communication from an enhanced node B (eNB); and
- update the threshold value based on the signal from the eNB.

24. The UE of claim 18, where the hardware circuitry is further configured to:
- increase the silencing factor by an increment factor (Q0) when the loading condition quantified by the function is greater than or equal to a threshold value; and
- decrease the silencing factor by a decrement factor (Q1) when the loading condition quantified by the function is less than the threshold value.

25. The UE of claim 24, where at least one of the increment factor or the decrement factor is static.

26. The UE of claim 24, wherein hardware circuitry is further configured to change one or more of the increment factor or the decrement factor when the silencing factor increases or decreases.

27. User equipment (UE) enabled for proximity services (ProSe), the ProSe-enabled UE comprising hardware circuitry configured to:
- receive device-to-device (D2D) discovery zone configuration information from an enhanced node B (eNB) to indicate a location of a discovery zone;
- monitor the discovery zone for D2D discovery signals transmitted by other UEs;
- receive discovery packets in the discovery zone from the other UEs;
- transmit a discovery signal in a first discovery period of the discovery zone; and
- retransmit the discovery signal in one or more subsequent discovery periods, wherein the hardware circuitry is configured to probabilistically elect whether to retransmit the discovery signal in the one or more subsequent discovery periods based on a conditional silencing probability, the conditional silencing probability being dynamically adjusted based on a number of times the discovery signal has been previously transmitted in the discovery zone.

28. The UE of claim 27, wherein the conditional silencing probability is constrained by one or more of: an upper bound or a lower bound.

* * * * *